UNITED STATES PATENT OFFICE.

SAMUEL N. LEWITES, OF NEW YORK, N. Y.

METHOD OF PREPARING IMMATURE VEGETABLES FOR FOOD.

1,261,412.  Specification of Letters Patent.  Patented Apr. 2, 1918.

No Drawing.  Application filed July 24, 1917.  Serial No. 182,386.

*To all whom it may concern:*

Be it known that I, SAMUEL N. LEWITES, a citizen of the United States, and residing at New York, in the county of New York and State of New York, have invented certain new and useful Methods of Preparing Immature Vegetables for Food, of which the following is a specification, such as will enable those skilled in the art to which it appertains to make and use the same.

It is a well known fact that tomatoes and peppers in ripening under natural conditions gradually change from a green to a red or yellow color, but this natural process of ripening does not always take place, the tomatoes and peppers remaining green owing to a late season, cold and wet weather, or similar conditions. At the present time such tomatoes and peppers are artificially ripened, or fermented, or "cured" by keeping them for a suitable length of time in a bath of brine, the length of time depending on the condition of the vegetable and sometimes extending over a period of two or three months, and the tomatoes and peppers prepared in this way are known at the present time as Dill tomatoes, Dill peppers, salt tomatoes, salt peppers, Dill pickles and the like.

Under the foregoing process the resulting product is either only partially fermented, or in some instances, the vegetables are only softened but not fermented, thus giving the product an insipid taste, this result being due to the fact that immature tomatoes and immature peppers possess a tough skin or covering membrane through which the brine, or the water of the brine could not easily pass, and before the water of the brine could pass through the covering skin or membrane, the sugar in the tomatoes and peppers has undergone a chemical or bacteriological change which prevented proper fermentation or interfered with the processes thereof.

To overcome the foregoing faults and objections, I have developed the following process of treatment. In my improved process the green tomatoes and green peppers are pierced or punctured by means of a suitable instrument, or instruments, so as to provide the skin or membrane covering thereof with a number of perforations or apertures through which the liquid, or water of the brine is free to pass, and without interfering with or destroying the original form or shape of the tomatoes or peppers, thus enabling the water of the brine to pass more freely into the interior part of the said tomatoes and peppers, and these punctures or perforations are preferably formed in the tops or top surfaces of the tomatoes and peppers by reason of the fact that the top surfaces of vegetables of the class specified are farther away from, or farther separated from the seeds therein than the bottom and side surfaces of said vegetables, and the further fact that the skin or covering membrane at the sides and bottom of such vegetables is weaker than at the top, and puncturing or perforating the sides or bottom thereof would probably result in tearing or rupturing the skin or covering membrane at the sides or bottom of the vegetables which would render my improved process less effective or efficient in the production of the desired results.

The water entering the tomatoes and peppers hydrolyzes the sugar therein and sets up a chemical action which produces carbonic acid gas which escapes into the brine and separates therefrom and may be carried off and discharged into any suitable receptacle or receptacles prepared therefor, and this process artificially ripens the vegetables and produces an edible product much quicker than any other heretofore known, the time involved being from one to two weeks, and depending upon the number of perforations or punctures in the skin or covering membrane of the vegetables and the size thereof, and in this process the peppers require less piercing or puncturing, or a less number of perforations or punctures than the skin or covering membrane of the tomatoes, by reason of the fact that the said peppers are more hollow, and the contents thereof less dense than is the case with tomatoes, thus permitting the water of the brine to enter more freely into the peppers and mingle more freely with the contents thereof.

During the above process the brine should be maintained at a temperature of 70° F. to 80° F., this temperature being most favorable to the process of fermentation and to the generation of the carbonic acid gas, which is necessarily evolved, and which may be carried off and discharged into proper receptacles, or discharged into the air if its preservation is not required.

My improved process is particularly designed for use in connection with tomatoes of any size and with large peppers, but may also be employed in the artificial ripening or fermentation of other vegetables of the same class.

Having fully described my invention, what I claim as new and desire to secure by Letters Patent, is:—

1. A process for artificially ripening, fermenting, or curing certain vegetables, which involves the puncture of the skin or covering membrane of the vegetable so as to provide the same with a number of small perforations or apertures, and immersing the said vegetables in a bath of brine.

2. A process for artificially ripening, fermenting or curing certain vegetables which involves the puncture of the skin or covering membrane of the vegetables at the top thereof so as to provide the same with a number of perforations or apertures, and immersing said vegetables in a bath of brine.

3. The process herein described for artificially ripening, fermenting or curing tomatoes and large peppers, which involves the puncture of the skin or covering membrane of said tomatoes and peppers at the top thereof so as to provide the same with a number of small perforations or apertures and immersing said tomatoes and peppers in a bath of brine.

In testimony that I claim the foregoing as my invention I have signed my name, in presence of the subscribing witnesses, this 21st day of July, 1917.

SAMUEL N. LEWITES.

Witnesses:
C. E. MULREANY,
H. E. THOMPSON.